United States Patent
Yasuda et al.

(10) Patent No.: US 7,133,592 B2
(45) Date of Patent: Nov. 7, 2006

(54) POLYMER OPTICAL WAVEGUIDE AND METHOD OF MAKING THE SAME

(75) Inventors: Hiroki Yasuda, Tokyo (JP); Kouki Hirano, Tokyo (JP); Tomiya Abe, Tokyo (JP); Yuzo Ito, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/081,022

(22) Filed: Mar. 16, 2005

(65) Prior Publication Data

US 2006/0133762 A1 Jun. 22, 2006

(30) Foreign Application Priority Data

Dec. 17, 2004 (JP) ............... 2004-365750

(51) Int. Cl.
*G02B 6/10* (2006.01)
(52) U.S. Cl. .............. 385/145; 385/131; 385/144
(58) Field of Classification Search .................. None
See application file for complete search history.

(56) References Cited

U.S. PATENT DOCUMENTS 6,487,354 B1 * 11/2002 Ferm et al. ............ 385/129
6,917,749 B1 * 7/2005 Gao et al. .............. 385/145

FOREIGN PATENT DOCUMENTS

| JP | 10-170739 A | 6/1998 |
|---|---|---|
| JP | 2002-189138 A | 7/2002 |
| JP | 2002-286953 A | 10/2002 |
| JP | 2003-215364 A | 7/2003 |
| JP | 2004-126399 A | 4/2004 |

\* cited by examiner

*Primary Examiner*—Rodney Bovernick
*Assistant Examiner*—Omar Rojas
(74) *Attorney, Agent, or Firm*—Foley & Lardner LLP

(57) ABSTRACT

A polymer optical waveguide has a substrate, a buffer layer formed on the substrate, and a polymer waveguide main body formed on the buffer layer. The buffer layer is made of a polymer material that can absorb a difference in thermal expansion coefficient between the substrate and the polymer optical waveguide.

13 Claims, 3 Drawing Sheets

POLYMER OPTICAL WAVEGUIDE AND METHOD OF MAKING THE SAME

The present application is based on Japanese patent application No. 2004-365750, the entire contents of which are incorporated herein by reference.

BACKGROUND OF THE INVENTION

1. Field of the Invention

This invention relates to a polymer optical waveguide with a buffer layer and a method of making the polymer optical waveguide.

2. Description of the Related Art

In recent years, polymer optical waveguides made of a polymer material are researched and developed since they are advantageous in workability and manufacturing cost as compared to glass optical waveguides made of a glass material.

Various polymer materials for a waveguide main body formed on a substrate are suggested, for example, acrylic (See Japanese patent application laid-open No. 10-170739), epoxy (See Japanese patent application laid-open No. 2002-286953), and polyimide (See Japanese patent application laid-open No. 2003-215364). There is a worry that these materials are disadvantageous in heat or moisture resistance since they can be subjected to a variation in refractive index or optical loss under high temperature and high humidity.

When a glass transition temperature of the waveguide main body falls within the working temperature range, the refractive index may be much more varied at a temperature higher than the glass transition temperature. In this case, the optical characteristics of the polymer optical waveguide will be affected more badly. Therefore, a material with a high glass transition temperature is generally used for the polymer waveguide main body.

On the other hand, Japanese patent application laid-open No. 2004-126399 (hereinafter referred to as '399) discloses a glass optical waveguide that is provided with a clad layer (made of glass such as $TiO_2$) for buffering a thermal stress with a linear expansion coefficient intermediate between its substrate and waveguide main body so as to reduce the thermal stress accumulated in the glass optical waveguide in changing the temperature to make the waveguide temperature-independent.

Further, Japanese patent application laid-open No. 2002-189138 discloses a method of a polymer optical waveguide that a stress generating film of metal is formed on the back of a substrate such that the substrate is previously bent by the stress generating film, and a waveguide main body is then formed on the surface of the substrate so as not to have an internal stress remained.

However, the polymer optical waveguide using a material with a high glass transition temperature has problems that the waveguide main body may be peeled off from the polymer waveguide main body or cracked when subjected to a heat-shock test (e.g., a test that the surrounding temperature is repeatedly increased and decreased in the temperature range of −40 to 85° C.) since where the waveguide main body is formed directly on the substrate.

Further, an optical multiplexer fabricated using such a polymer optical waveguide must have a variation in optical output when the surrounding temperature is changed.

The clad layer (made of glass such as $TiO_2$) of '399 concerning the glass optical waveguide is effective when a difference in linear expansion coefficient between the substrate and the waveguide main body is small. However, incase of the polymer optical waveguide, since the linear expansion coefficient of the waveguide main body is much greater than that of a typical Si wafer or silica glass substrate, the difference in linear expansion coefficient between the substrate and the waveguide main body must be big.

Therefore, if the clad layer of '399 is directly used for the polymer optical waveguide, the buffering effect will be insufficient. In order to have the sufficient buffering effect, the thickness must be much increased. Further, since the clad layer of '399 is made of glass, it is difficult to process as compared to resins and therefore the manufacturing cost increases.

SUMMARY OF THE INVENTION

It is an object of the invention to provide a polymer optical waveguide that has a good heat-shock property and temperature characteristic.

It is a further object of the invention to provide a method of making the above polymer optical waveguide inexpensively.

(1) According to one aspect of the invention, a polymer optical waveguide comprises:
  a substrate;
  a buffer layer formed on the substrate; and
  a polymer waveguide main body formed on the buffer layer,
  wherein the buffer layer comprises a polymer material that can absorb a difference in thermal expansion coefficient between the substrate and the polymer optical waveguide.

It is preferred that the substrate comprises silicon (Si) or silica glass, and the polymer waveguide main body comprises a polymer material that has a linear expansion coefficient different from the substrate.

It is preferred that the polymer waveguide main body comprises a polymer material selected from UV curing acrylic, fluorinated acrylic, epoxy and photosensitive polyimide polymers.

It is preferred that the buffer layer has a glass transition temperature in the range of 10 to 60° C. and an elasticity in rubbery state of $5 \times 10^7$ Pa or less.

It is preferred that the buffer layer comprises a resin or rubber with a cross-linking structure.

It is preferred that the buffer layer comprises a polymer material selected from UV curing acrylic, acrylic, epoxy, urethane and fluorocarbon resins, silicone rubber, and combined resins of these materials.

It is preferred that the buffer layer has a thickness of 10 to 100 μm.

(2) According to another aspect of the invention, a method of making a polymer optical waveguide comprises:
  a first step of providing a substrate;
  a second step of forming a buffer layer on the substrate; and
  a third step of forming a polymer waveguide main body on the buffer layer,
  wherein the buffer layer formed in the second step comprises a polymer material that can absorb a difference in thermal expansion coefficient between the substrate and the polymer optical waveguide.

It is preferred that the substrate provided in the first step comprises silicon (Si) or silica glass, and the polymer waveguide main body formed in the third step comprises a polymer material that has a linear expansion coefficient different from the substrate.

The second step may comprise a process of coating an uncured resin in liquid form on the substrate and then curing the resin to form the buffer layer.

The first step may comprise a process of coating a silane coupling agent on the substrate before forming the buffer layer on the substrate.

(3) According to another aspect of the invention, a polymer optical waveguide comprises:
a substrate;
a buffer layer formed on the substrate; and
a polymer waveguide main body formed on the buffer layer,
wherein the buffer layer comprises a polymer material that has a glass transition temperature in the working temperature range of the polymer optical waveguide.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
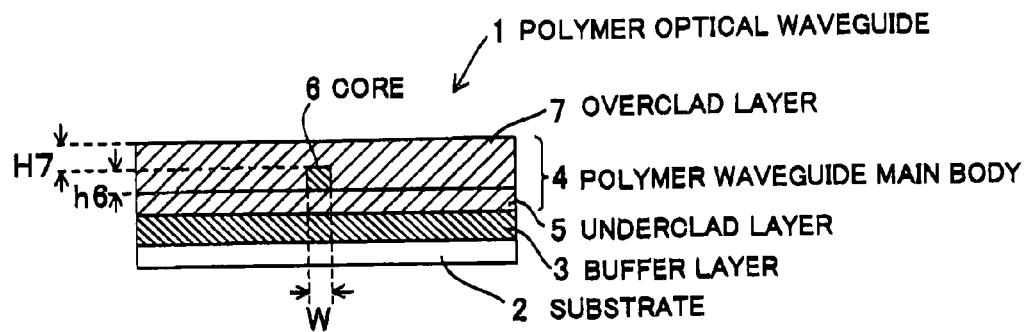
FIG. 1 is a cross sectional view showing a polymer optical waveguide in a preferred embodiment according to the invention.

FIG. 1 is a cross sectional view showing a polymer optical waveguide 1 in the preferred embodiment according to the invention.

(Composition of the Polymer Optical Waveguide 1)

As shown in FIG. 1, the polymer optical waveguide 1 of this embodiment is composed of: a substrate 2; a buffer layer 3 formed on the substrate 2; and a polymer waveguide main body 4 formed on the buffer layer 3.

The substrate 2 is made of an inorganic material such as Si and silica glass. In this embodiment, the substrate 2 used is a Si wafer (=Si substrate) of 400 μm in thickness.

The polymer waveguide main body 4 is made of a polymer with a linear expansion coefficient different from that of the substrate 2. The polymer waveguide main body 4 is composed of: an underclad (=lower clad) layer 5; a core 6 formed on the underclad layer 5; and an overclad (=upper clad) layer 7 that covers the upper surface of the underclad layer 5 and the core 6.

In this embodiment, the polymer may be polymers with a cross-linking structure that are of UV (=ultraviolet) curing acrylic polymers (cross-linked type) and have a glass transition temperature Tg of 120° C. The reason why the polymer with the cross-linking structure is used is that it has a high resistance to solvent and a high heat resistance. The refractive index of the core 6 is set to be higher than that of the underclad layer 5 and the overclad layer 7.

In this embodiment, the underclad layer 5 has 20 μm in thickness, the core 6 with a rectangular cross section has 60 m in diameter (i.e., with a core width w of 60 μm and a core height h6 of 60 μm), and a thickness h7 from the upper surface of the core 6 to the surface of the overclad layer 7 is 20 g m. Meanwhile, the dimensions of the waveguide are not specifically limited and can be designed freely.

The polymer may be of, for example, fluorinated acrylic polymers, epoxy polymers and photosensitive polyimide polymers.

(Buffer Layer 3)

The buffer layer (or film) 3 is made of a material that can absorb a stress caused by a difference in thermal expansion coefficient between the substrate 2 and the polymer waveguide main body 4. In other words, since the substrate 2 has a linear expansion coefficient different from the polymer waveguide main body 4, the buffer layer 3 serves to relax (or reduce) the thermal stress caused between the substrate 2 and the polymer waveguide main body 4 in changing the temperature.

The buffer layer 3 is suitably a material with a small elasticity. Furthermore, the buffer layer 3 is suitably a material that can absorb the difference in thermal expansion coefficient between the substrate 2 and the polymer waveguide main body 4 in the range of working temperature of the polymer optical waveguide 1 or in the temperature range, −50 to 100° C., of heat-shock test.

In more detail, it is preferred that the buffer layer 3 has a glass transition temperature Tg in the range of 10 to 60° C. and has a elasticity E of $5\times10^7$ Pa or less in a rubbery state.

The rubbery state means a soft solid state that molecules can move easily so that they are flown when pulled or pressed to cause an elongation or contraction in the buffer layer 3. In contrast, a glassy state means a hard solid state that molecules are in random order, not crystallized (=amorphous) so that they are not much flown even when pressed. The glass transition temperature Tg is a temperature at the boundary point between the rubbery state and the glassy state.

The reasons why the glass transition temperature Tg and the elasticity E of the buffer layer 3 are limited as described above are as follows.

Figure 2:
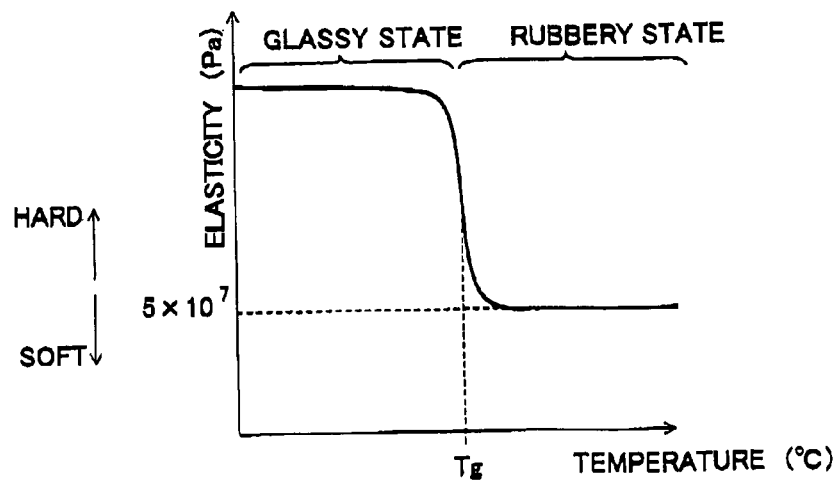
FIG. 2 is a graph showing a relationship between temperature and elasticity in a buffer layer.

FIG. 2 is a graph showing a relationship between temperature T (° C.) and elasticity E (Pa) in the buffer layer 3. In FIG. 2, the elasticity E is indicated by the logarithmic scale. As shown in FIG. 2, in the rubber state, as compared to the glassy state, the elasticity E decreases to a different order in scale (abruptly reduced) and the buffer layer 3 is thus softened so that it can have an enhanced effect as a buffer layer. Therefore, when the glass transition temperature Tg falls within the range of the working temperature of the polymer optical waveguide 1, the effect of the buffer layer can be expected. However, if the glass transition temperature Tg does not come to 60° C. or less, which is the upper limit of the working temperature of the polymer optical waveguide 1, the effect will decrease.

On the other hand, although it is thought that the thermal stress is less generated as the rubbery-state range of the buffer layer 3 increases, if the glass transition temperature Tg becomes less than 10° C., the problem will occur that the dicing becomes difficult since it is too soft.

Further, if the elasticity E in the rubbery state exceeds $5\times10^7$ Pa, the reduction of the elasticity E in the rubbery state becomes insufficient. Therefore, the buffer layer 3 becomes hard and the effect of the buffer layer will decrease.

The buffer layer 3 is to be made of a cross-linked material such as resin with a cross-linking structure so that it does not flow even in a high temperature.

The buffer layer 3 is to be 10 to 100 μm in thickness. If it is less than 10 μm in thickness, the effect of the buffer layer cannot be obtained. If it exceeds 100 μm in thickness, it cannot have an uniform layer when formed by spin coating described later. In this embodiment, the buffer layer 3 is set to be 15 μm in thickness.

In this embodiment, the buffer layer 3 may be made of resins with a cross-linking structure that are of UV (=ultraviolet) curing acrylic resin (cross-linked type) and have a glass transition temperature Tg of 120° C. The reason why the UV curing resin with the cross-linking structure is used is that it is quickly hardened and can easily form the buffer layer 3.

The buffer layer 3 may be made of resins with a cross-linking structure such as acrylic, epoxy, urethane and fluorocarbon resins, silicone rubber, or combined resins (e.g., acrylic+fluorocarbon resins, epoxy+fluorocarbon resins) of these materials.

In order to prevent the peeling of the polymer waveguide main body 4, it is also important that the buffer layer 3 has an adhesion force. The buffer layer 3 needs to be made of a material that allows a good adhesion force between the substrate 2 and the polymer waveguide main body 4. For example, a combination of materials is available that the buffer layer 3 is made of fluorocarbon resins when making the polymer waveguide main body 4 of fluorocarbon polymers in consideration of the adhesion force.

Further, since the buffer layer 3 has the problem of intermixing (which means a mixture between polymers), it is desired that the buffer layer 3 is made of a material that is not dissolved or permeated into the clad material (which forms the underclad layer 5 after the curing) to be coated thereon after forming the buffer layer 3.

(Method of Making the Polymer Optical Waveguide 1)

Next, a method of making the polymer optical waveguide 1 will be explained.

Figure 3A:
FIGS. 3A to 3F are cross sectional views showing a method of making a polymer optical waveguide in a preferred embodiment according to the invention.
Figure 3B:

First, the substrate 2 is provided (FIG. 3A: the first step) Then, the buffer layer 3 is formed on the substrate 2 (FIG. 3B: the second step).

An example of forming the buffer layer 3 on the substrate 2 will be explained below referring to FIGS. 4A to 4C.

Figure 4A:
FIGS. 4A to 4C are cross sectional views showing a method of forming the buffer layer.

Before forming the buffer layer 3 on the substrate 2, a silane coupling agent c is coated on the substrate 2 to allow the surface treatment of the substrate 2 (FIG. 4A). The abovementioned first step of providing the substrate 2 includes this surface treatment in FIG. 4A.

Figure 4B:
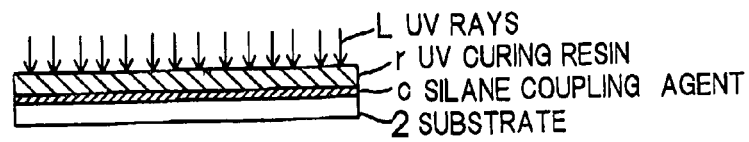
Figure 4C:

Then, resin r, which is in liquid form and has an uncured cross-linking structure, is coated on the surface-treated substrate 2 by spin coating, and the coated resin r is cured (FIG. 4B).

In more detail, the resin r used in this embodiment is of UV curing type. After the liquid resin r is coated, ultraviolet rays L are irradiated to the resin r from above to cure the coated resin r as shown in FIG. 4B, and thereby the buffer layer 3 is formed (FIG. 4C). Thus, the abovementioned second step includes the steps as shown in FIGS. 4B and 4C.

The resin r is coated on the substrate 2 while containing monomers and oligomers therein. Thus, since unreacted groups are left therein, the resin r can be easily adhered to the silane coupling agent c when it is cured (polymerized or resinified). Since the resin r can be easily chemically bonded to the silane coupling agent c, the adhesion force between the substrate 2 and resin r can be enhanced. Thereby, the buffer layer 3 becomes less likely to be peeled from the substrate 2.

Alternatively, if the resin r has a good adhesion force to the substrate 2, the step of coating the silane coupling agent c as shown in FIG. 4A may be omitted.

Returning to the steps in FIGS. 3A to 3F, the process of forming the core 6 as shown in FIG. 1 by direct exposure will be explained below.

Figure 3C:
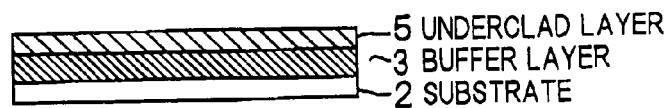
Figure 3D:
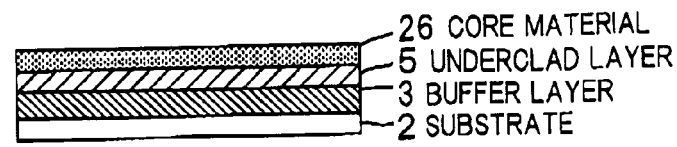

After the buffer layer 3 is formed, the underclad layer 5 is formed on the buffer layer 3 (FIG. 3C). A core material 26 is coated on the underclad layer 5 (FIG. 3D).

Figure 3E:
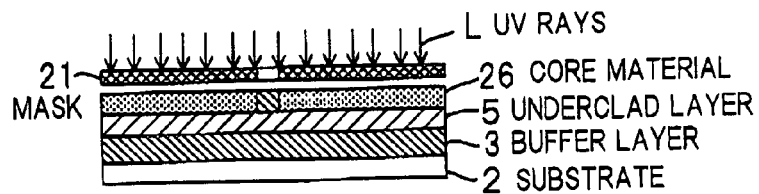

After the core material 26 is coated, a mask 21 with a pattern corresponding to the core 6 is disposed on the core material 26, and ultraviolet rays L are irradiated to the core material 26 from above the mask 21 (FIG. 3E). Then, a portion of the core material 26 not irradiated by the ultraviolet rays L is removed by etching with a core developer. A portion of the core material 26 irradiated by the ultraviolet rays L is cured to form the core 6, which is not etched with the core developer. In this embodiment, the core developer is acetone.

The core developer may be, for example, butyl acetate, ethyl acetate, methyl ethyl ketone, methyl isobutyl ketone, propylene glycol monomethyl ether, propylene glycol, toluene, xylene.

After the core 6 is formed, the overclad layer 7 is formed covering the upper surface of the underclad layer 5 and the core 6 so as to form the polymer waveguide main body 4. The third steps of forming the polymer waveguide main body 4 on the buffer layer 3 are as shown in FIGS. 3C to 3F.

Figure 3F:
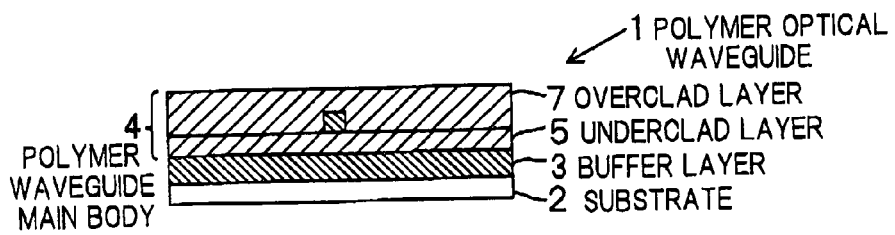

Then, by dicing it into a predetermined shape, the polymer optical waveguide 1 with the buffer layer 3 as shown in FIG. 1 can be obtained (FIG. 3F).

The polymer optical waveguide 1 obtained is subjected to a heat-shock test (heat-cycle test) that the surrounding temperature is repeatedly increased and decreased 1000 cycles in the range of −40 to 85° C. As a result, the polymer waveguide main body 4 is not peeled off and the loss of the polymer optical waveguide 1 does not increase.

(Functions and Effects of the Embodiment)

Next, the functions and effects of the embodiment will be described below.

In the polymer optical waveguide 1, the polymer waveguide main body 4 has a linear expansion coefficient much greater than that of the substrate 2. In general, a linear expansion coefficient of 20 ppm/° C. ($=20 \times 10^{-6}$/° C.) or less is provided for the substrate 2 made of an inorganic material, for example, 10 ppm/° C. for typical glass substrates, 0.5 ppm/° C. for a silica substrate, and 3 ppm/° C. for a Si substrate. In contrast, a linear expansion coefficient of 50 to 200 ppm/° C. is generally provided for the polymer waveguide main body 4 made of an organic material.

Therefore, as the surrounding temperature increases, the polymer waveguide main body 4 is elongated much and the substrate 2 is not elongated so much. Thus, a difference in thermal expansion coefficient is generated between the substrate 2 and the polymer waveguide main body 4. On the other hand, as the surrounding temperature decreases, the polymer waveguide main body 4 is contracted much and the substrate 2 is not contracted so much. Thus, a difference in thermal expansion coefficient (in this situation, also called thermal contraction coefficient) is also generated between the substrate 2 and the polymer waveguide main body 4.

In the polymer optical waveguide 1, even when a large difference in thermal expansion coefficient is generated between the substrate 2 and the polymer waveguide main body 4, the soft buffer layer 3 formed between the substrate 2 and the polymer waveguide main body 4 allows the absorption or lowering of the stress generated due to the difference in thermal expansion coefficient therebetween. Namely, since the thermal stress generated between the substrate 2 and the polymer waveguide main body 4 in changing the temperature can be sufficiently reduced, the substrate 2 and the polymer waveguide main body 4 is less likely to be affected by the thermal stress.

Therefore, even when the polymer optical waveguide 1 is subjected to the heat-shock test, the polymer waveguide main body 4 will not peeled off from the substrate 2 or cracked. Thus, the polymer optical waveguide 1 can have a good resistance to heat shock.

Furthermore, even when the surrounding temperature changes, the polymer waveguide main body 4 is less likely to have a strain accumulated therein. Thereby, a change in optical characteristics such as an increase in loss will be reduced. Thus, the polymer optical waveguide 1 can have a good temperature characteristic by that much.

On the other hand, in the method of the embodiment, the buffer layer 3 can be formed easily in a shorter period of time since the uncured resin r in liquid form only has to be coated on the substrate 2 and then cured. The resin r used for the buffer layer 3 is easy to process comparing to the glass material and allows the lower manufacturing cost than the glass material. Thus, the polymer optical waveguide 1 with the buffer layer can be produced inexpensively.

Although in the above embodiment the core 6 is formed by the direct exposure process, the core 6 may be formed by using a mold or by RIE (reactive ion etching).

Figure 5A:
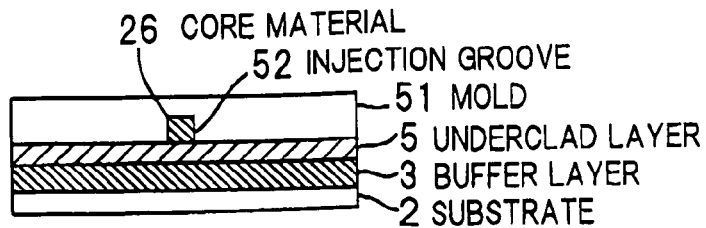
FIGS. 5A and 5B are cross sectional views showing a method of forming a core.
Figure 5B:
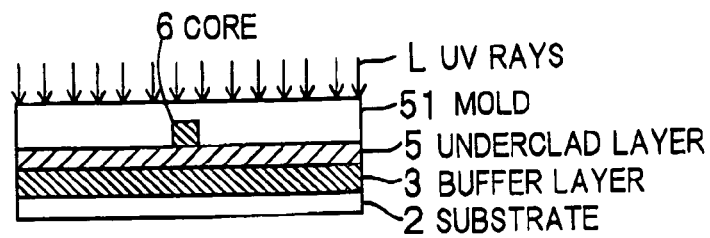

FIGS. 5A and 5B are cross sectional views showing a method of forming a core 6. In case of using the mold, after the steps of FIGS. 3A to 3C, as shown in FIG. 5A, a mold 51, which has an injection groove 52 with the same pattern as the core 6 and is transparent to ultraviolet rays, is disposed on the underclad layer 5. Then, the core material 26 is injected into the injection groove 52. Then, as shown in FIG. 5B, ultraviolet rays are irradiated to the core material 26 from above the mold 51 to cure the injected core material 26 to form the core 6. Alternatively, when the substrate 2, the buffer layer 3 and the underclass layer 5 are transparent to ultraviolet rays, the ultraviolet rays may be irradiated to the core material 26 from below the substrate 2.

On the other hand, a modification of the polymer optical waveguide 1 may be constructed such that the buffer layer 3, the core 6 and the overclad layer 7 are formed in that order on the substrate 2. Namely, in this modification, the underclad layer 5 may be eliminated by providing the buffer layer 3 with the functions of the underclad layer 5. In this case, the buffer layer 3 is made of a resin that is transparent to light transmitted through the core 6.

(Example of Optical Device)

Figure 6:
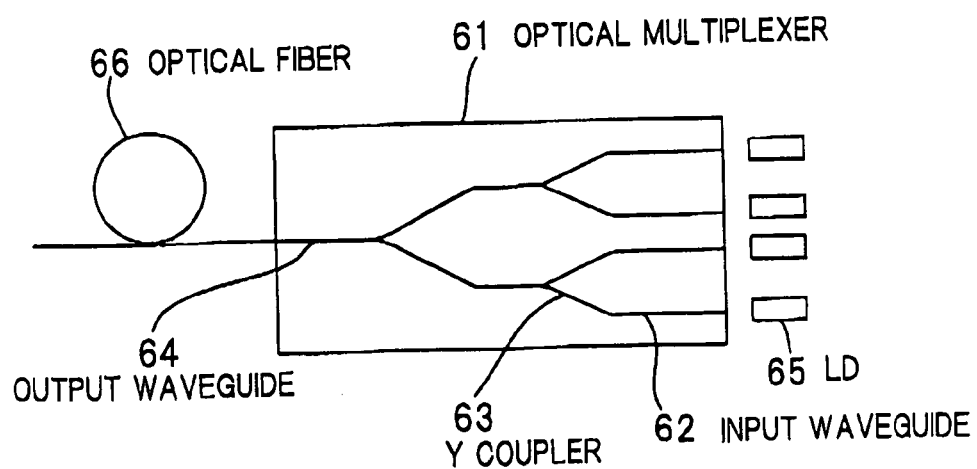
FIG. 6 is a plain view showing an optical multiplexer using the polymer optical waveguide in FIG. 1.

FIG. 6 is a plain view showing an optical multiplexer as an optical device using the polymer optical waveguide in FIG. 1.

As shown in FIG. 6, the optical multiplexer 61 is a four-input and one output type polymer optical waveguide that the core 6 in FIG. 1 is composed of four input waveguides 62, three Y couplers 63, and one output waveguide 64. The input waveguides 62 are connected with LD's (semiconductor lasers) 65 to output optical signals with wavelength bands different from one another. The output waveguide 64 is connected to an optical fiber 66.

In the optical multiplexer 61, the four optical signals inputted from the LD's 65 to the input waveguides 62 are multiplexed by the three Y couplers 63, outputted as one optical signal with the four wavelength division multiplexed optical signals from the output waveguide 64, transmitted to the optical fiber 66.

As described earlier, the optical multiplexer using the conventional polymer optical waveguide is constructed such that the polymer waveguide main body is mounted directly on the substrate and the linear expansion coefficient is different between the substrate and the polymer waveguide main body. Therefore, it has problems that the polymer waveguide main body must have strains accumulated in changing the surrounding temperature and thereby it will have a variation in the amount of light output. For the same reason, the optical characteristics will be affected, e.g., the PDL (polarization dependent loss) increases.

In comparison to this, the optical multiplexer 61 of the invention has the buffer layer 3 (FIG. 1) that allows the reduction of thermal stress generated in changing the temperature. Therefore, the variation in the light output can be reduced even when the surrounding temperature changes. Also, the variation in the optical characteristics such as an increase in PDL can be reduced.

The polymer optical waveguide 1 can be applied to a VOA (variable optical attenuator), an optical coupler, CWDM (coarse wavelength division multiplexing) type AWG (arrayed waveguide grating) etc, other than the optical multiplexer mentioned above. The polymer optical waveguide 1 may be single mode or multimode.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A polymer optical waveguide, comprising:
   a substrate comprising silicon (Si) or silica glass;
   a buffer layer formed on the substrate; and
   a polymer waveguide main body formed on the buffer layer,
   wherein the buffer layer comprises a polymer material having a glass transition temperature in the range of 10 to 60° C. and an elasticity in a rubbery state of $5 \times 10^7$ Pa or less that can absorb a difference in thermal expansion coefficient between the substrate and the polymer waveguide main body.

2. The polymer optical waveguide according to claim 1, wherein:
   the polymer waveguide main body comprises a polymer material that has a linear expansion coefficient different from the substrate.

3. The polymer optical waveguide according to claim 1, wherein:
   the polymer waveguide main body comprises a polymer material selected from UV curing acrylic, fluorinated acrylic, epoxy and photosensitive polyimide polymers.

4. The polymer optical waveguide according to claim 1, wherein:
   the buffer layer comprises a resin or rubber with a cross-linking structure.

5. The polymer optical waveguide according to claim 1, wherein:
   the polymer material comprising the buffer layer is selected from UV curing acrylic, acrylic, epoxy, urethane and fluorocarbon resins, silicone rubber, and combined resins of these materials.

6. The polymer optical waveguide according to claim 1, wherein:

the buffer layer has a thickness of 10 to 100 µm.

7. The polymer optical waveguide according to claim 1, wherein:
the buffer layer is made of a material that does not dissolve or permeate into a clad material of the polymer waveguide main body formed on the buffer layer.

8. The polymer optical waveguide according to claim 1, wherein:
the polymer waveguide main body comprises a core and an over clad layer, and the buffer layer is made of a resin transparent to light transmitted through the core, wherein the buffer layer is used in place of an under clad layer.

9. A method of making a polymer optical waveguide, comprising:
a first step of providing a substrate comprising silicon (Si) or silica glass;
a second step of forming a buffer layer on the substrate; and
a third step of forming a polymer waveguide main body on the buffer layer,
wherein the buffer layer formed in the second step comprises a polymer material having a glass transition temperature in the range of 10 to 60° C. and an elasticity in a rubbery state of $5 \times 10^7$ Pa or less that can absorb a difference in thermal expansion coefficient between the substrate and the polymer waveguide main body.

10. The method according to claim 9, wherein:
the polymer waveguide main body formed in the third step comprises a polymer material that has a linear expansion coefficient different from the substrate.

11. The method according to claim 9, wherein:
the second step comprises a process of coating an uncured resin in liquid form on the substrate and then curing the resin to form the buffer layer.

12. The method according to claim 9, wherein:
the first step comprises a process of coating a silane coupling agent on the substrate before forming the buffer layer on the substrate.

13. A polymer optical waveguide, comprising:
a substrate comprising silicon (Si) or silica glass;
a buffer layer formed on the substrate; and
a polymer waveguide main body formed on the buffer layer,
wherein the buffer layer comprises a polymer material that has a glass transition temperature in the working temperature range of the polymer optical waveguide and an elasticity in a rubbery state of $5 \times 10^7$ Pa or less.

* * * * *